UNITED STATES PATENT OFFICE.

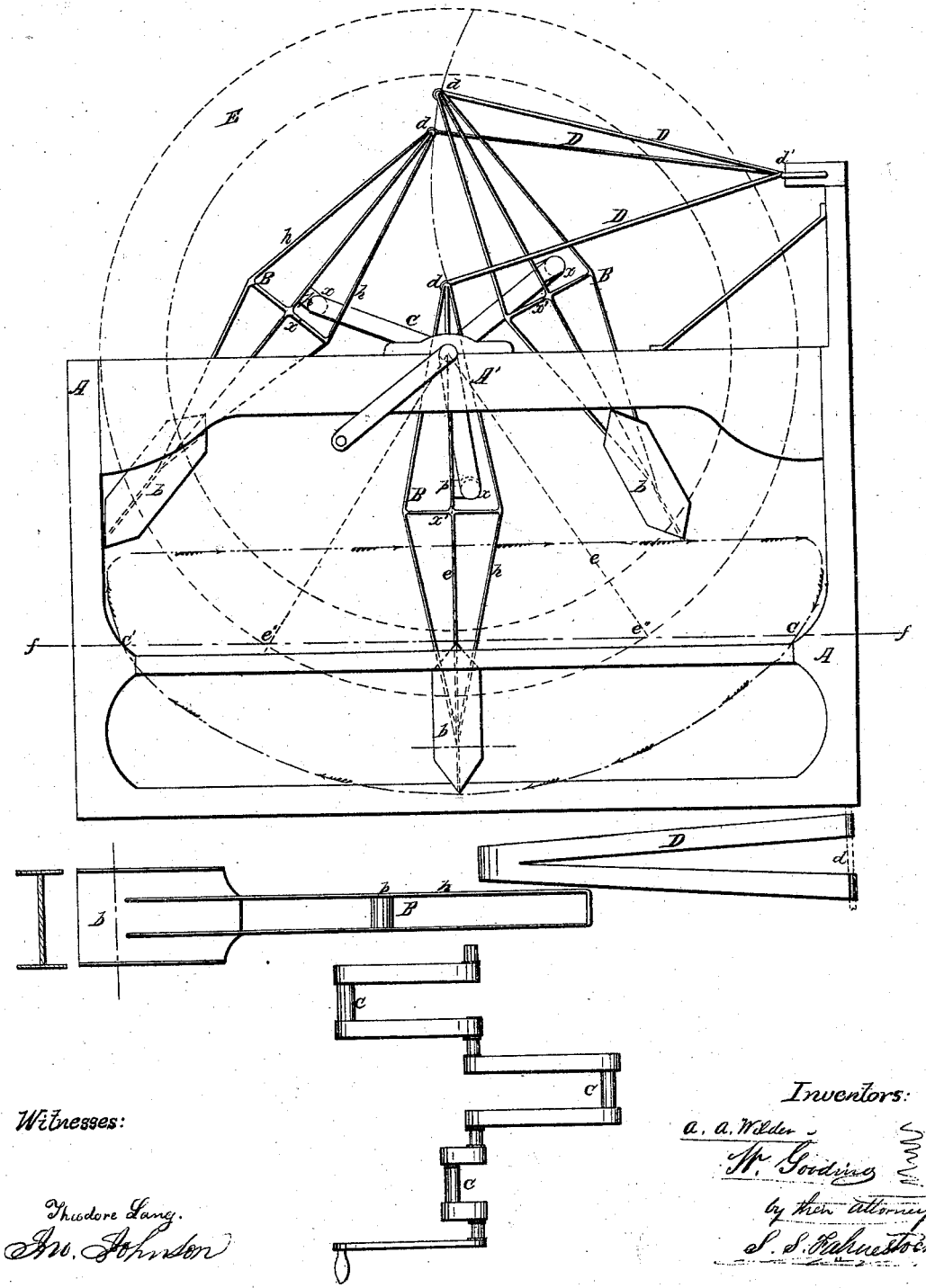

ARETUS A. WILDER AND WILLIAM GOODING, OF DETROIT, MICHIGAN.

IMPROVED PROPELLER.

Specification forming part of Letters Patent No. 54,801, dated May 15, 1866.

*To all whom it may concern:*

Be it known that we, ARETUS A. WILDER and WILLIAM GOODING, of the city of Detroit, in the county of Wayne, in the State of Michigan, have invented a new and Improved Mode of Propelling Steamboats; and we do hereby declare that the following is a full and exact description thereof, reference being had to the accompanying drawings, and to the letters of reference marked thereon, like parts being indicated by the same letters in the several figures.

The nature of our invention consists in providing one or more paddles working on a crank-shaft, the upper ends of the paddles being pivoted to radial arms attached to bulk-head, giving the same a vertical as well as longitudinal movement, thereby increasing the dip as well as reach or length of stroke.

The object of this invention is to economize power and gain speed.

In the drawings, A A may represent what is ordinarily called a "paddle-wheel box" or frame-work inclosing crank-shaft and paddles. B represents the paddles, and $b$ their buckets or blades. C is the crank-shaft, secured in boxes to cross-pieces A'. D are radial arms hinged to the top of paddles at $d$, as also to bulk-head at $d'$. E represents an ordinary circular paddle-wheel, three arms or buckets of which, $e$, are indicated, showing the points $e''$ where they enter the water and emerge, the center one showing the dip. This wheel may be said, by scale, to be thirty-six feet in diameter, showing a dip of but three feet and sweep of eighteen or twenty feet. $ff$ indicates the water-line.

In the drawings, the right-hand paddle B is in a position preparatory to entering the water; the middle one is submerged, showing its dip; the left-hand one has just emerged from the water, and is about passing over to the right to enter again.

The red line with arrows shows the curve described by the lower ends of buckets, and the blue one that described by the upper ends of the paddles.

Now, it will be seen that our paddles enter at $c$ and emerge at $c'$, having a reach of some thirty-four feet and a dip of eight. Contrasting this with the data above as to a circular wheel shows such a difference in favor of ours it is not necessary to point out further the distinctions or advantages of ours over it.

In the drawings three paddles only are shown and their relative position. The number may be increased or decreased at pleasure, the crank-shaft to be constructed according to such changes.

The paddles work on shafts at $x$, being provided with suitable boxes properly secured to the paddles.

The buckets or blades of our paddles have flanges before and behind, strengthening them as well as rendering them more effective, as the water cannot pass off at their sides so easily, and a kind of vacuum or eddy is left behind.

We construct our buckets with diagonal braces $h$, besides the center-rod. We show four to each blade. Below they run down about half-way upon the bucket, adding to its strength. Alone they connect with top part of central rods, which the radial arms are hinged to.

The paddles have additional cross-braces $x'$ at or near their centers, below crank-boxes $p$, which are properly secured to center rods and on one side of same.

The radial arms are made wider where they are hinged to bulk-head. They are represented also with two legs. The width gives steadiness to the top end of paddle, where the narrow end is hinged.

Having thus described our invention, what we claim as new, and desire to secure by Letters Patent of the United States, is—

The combination of said double-flanged buckets with paddles, crank-shafts, and radial arms, constructed substantially as shown and described, and for the purpose set forth.

ARETUS A. WILDER.
WILLIAM GOODING.

Witnesses:
JULIUS STALL,
CARL SCHUREMANN.